July 14, 1959  F. OTTO  2,894,551
MEAT CUTTER
Filed March 14, 1957  3 Sheets-Sheet 1

July 14, 1959      F. OTTO      2,894,551
MEAT CUTTER

Filed March 14, 1957      3 Sheets-Sheet 2

United States Patent Office 2,894,551
Patented July 14, 1959

2,894,551

MEAT CUTTER

Fritz Otto, Hameln (Weser), Germany, assignor to A. Stephan u. Sohne, Hameln (Weser), Germany, a corporation of Germany Application March 14, 1957, Serial No. 646,102

10 Claims. (Cl. 146—68)

The present invention relates to power operated cutting machines, cutters having rotating cutting blades and particularly to a machine for comminuting meat and other materials. This application is a continuation-in-part of my application, Serial No. 378,327, filed September 3, 1953 and now abandoned.

Because of its fibrous structure, meat is more difficult to cut than most other substances. This is particularly true of the type of meat used for frankfurters, sausages and similar meat products. Heretofore the meat for such products has been comminuted by means of grinders in which the meat is fed to a cutter by a rotating screw and is cut by a crushing shearing action between a rotary cutter and a stationary apertured shear plate. Such grinders are relatively expensive, slow and hard to clean. Moreover, it is usually necessary to feed the meat through the grinder several times to obtain the desired fineness.

Meat cutters having knives rotatable about a horizontal axis are also known. In these machines the bowl must be rotated in order to mix the material being cut. The need of driving both the knives and the bowl makes the machine heavy, complicated and expensive. Moreover, the only effective cutting action is at the lower side of the bowl. During the upper portion of its travel, the knives run light since they are out of the material. This results not only in a low overall efficiency of the machine but also in considerable vibration. A further disadvantage is that the cut material must be removed from the machine by hand. This is a tedious, time-wasting and in some cases dangerous operation.

It is an object of the present invention to provide an improved cutter that is relatively inexpensive, is easy to use and easy to clean and is rapid and effective in its cutting operation. By reason of these characteristics, the machine is suitable for use not only in meat packing plants but also in butcher shops, restaurants, hotels, hospitals and other institutions.

In accordance with the invention cutter knives or blades are arranged on a rapidly rotating vertical shaft in a stationary cutter bowl. The cutter knives are mounted on the shaft so as to be variably inclined relative to the bottom of the bowl and thus have a predetermined pitch. By being inclined at a selected angle so that the sharp leading edges are higher than the trailing edges, the cutter blades in their rotary movement force the material down toward the bottom of the bowl as it is being cut. At the same time, centrifugal action resulting from the rapid rotation of the blades moves the material radially outwardly toward the side walls of the bowl. The continued movement of the material downwardly and radially outwardly forces the previously cut material to move up along the side walls of the bowl and then inwardly and downwardly into the zone of action of the cutter. There is thus produced an automatic and continuous recirculation of the material in the bowl to subject the material to the repeated action of the cutter blades until it has been comminuted to the desired degree of fineness. At the same time a thorough intermixing of the material is effected. The way in which the blades are mounted on the shaft permits selection of the desired inclination or pitch of the blades to obtain the cutting action desired for the particular material being cut. In order to obtain effective recirculation of the material and avoid the presence of "dead spots" the lowermost cutter blade is preferably close to the bottom of the bowl. The angle between the blades and the axis of the shaft is also preferably adjustable so that the blades can be arranged perpendicular to the shaft or inclined upwardly or downwardly. This permits variation of the distance between the blades and the bottom of the bowl and also permits variation in the direction of forces acting on the material being cut. Thus it will be seen that if the blades are inclined outwardly and downwardly in a lengthwise direction and also have a selected pitch by being inclined rearwardly and downwardly in a transverse or chordwise direction, the resultant forces produced by the combined inclinations of the blades will be directed downwardly and inwardly. Conversely if the blades are inclined upwardly and outwardly in a longitudinal direction the resultant forces will be directed downwardly and outwardly. The inwardly or outwardly acting components of these forces can thus be used to counteract or augment to a desired degree the action of centrifugal force. The use of single-ended blades having a hole in one end for mounting on the shaft and the individual adjustability of the blades makes possible many different combinations of blade adjustment. The construction in accordance with the invention thus makes it possible to obtain in a very simple manner the exact cutting and mixing action desired.

Another feature of the apparatus in accordance with the invention is that it is easy and safe to use and hence suitable for general use. In the preferred embodiment herein particularly described, an electric motor for driving the blades is mounted on the underside of the bowl and the entire unit comprising the bowl, blades, shaft and motor is mounted so as to be tippable about a horizontal axis to empty the material from the bowl. As a safety feature the bowl is provided with a cover and an interlocking system prevents the motor from being turned on when the cover is open or when the bowl is tipped.

A further feature of the invention in its preferred embodiment is that the electric motor driving the blades is reversible and runs at a lower speed in reverse direction. For example, it may run at a speed of the order of 2800 to 3600 r.p.m. in forward direction and 1400 to 1800 r.p.m. in reverse direction. By driving the blades in reverse direction at a lower speed, there is obtained an effective mixing action without cutting. Thus after the material has been cut to the desired fineness, seasoning or other material can be mixed in. This makes it possible to use the same machine for both cutting and mixing, thereby avoiding the cost and space requirements of additional machinery and eliminating the work of transferring the material from one machine to another.

The construction in accordance with the invention permits quick and easy cleaning and servicing of the apparatus. The blades are preferably clamped in adjusted position on a hollow mandrel which in turn is mounted on the motor shaft. The blades can hence be removed individually or the blade and mandrel assembly can be removed as a unit for cleaning without disturbing the selected inclination of the blades or their spacing from the bottom of the bowl and from each other.

Other features, objects and advantages of the invention will be understood from the following specification and claims in conjunction with the accompanying drawings which show by way of example a preferred embodiment of the invention and in which:

Figure 1:
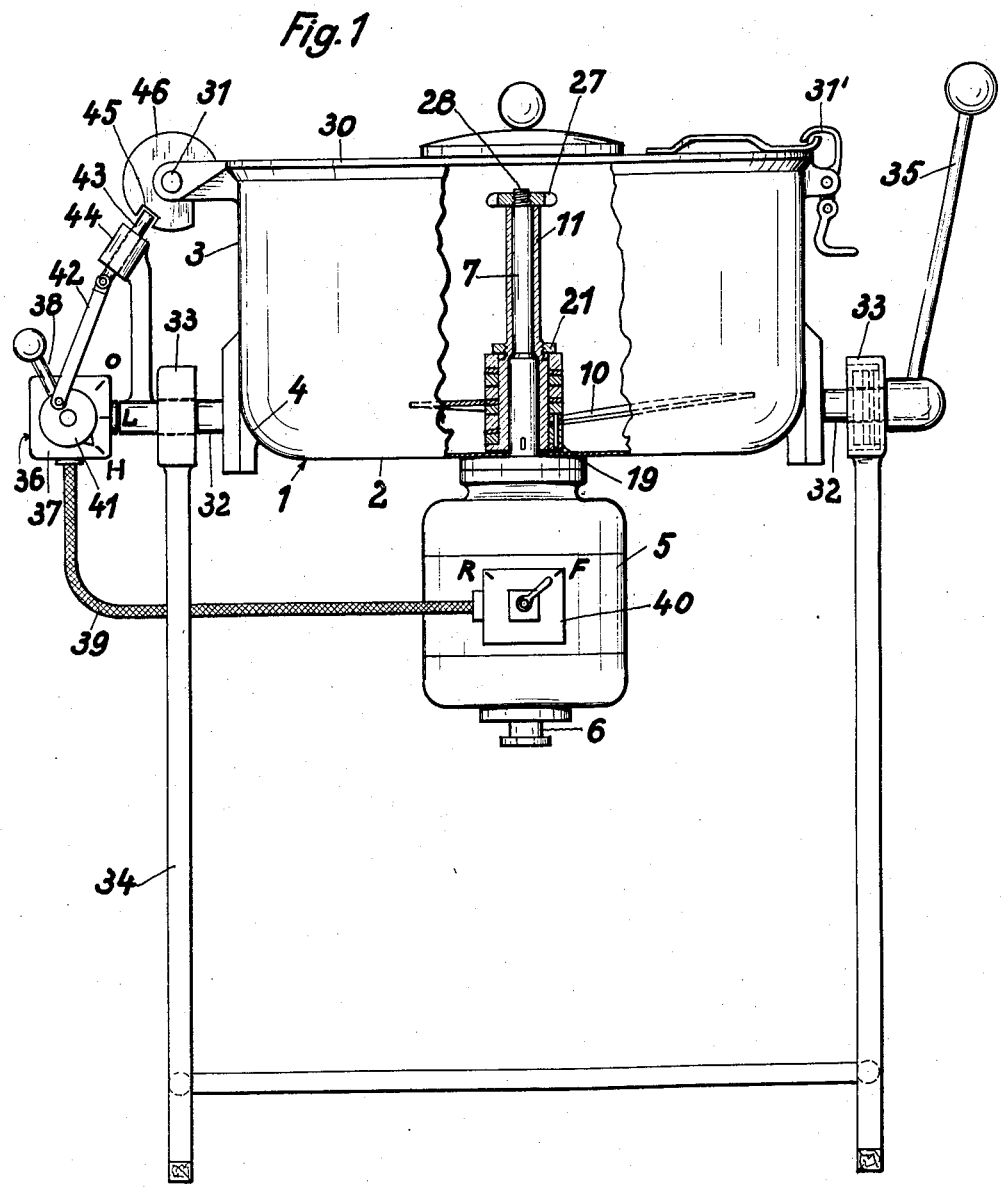
Fig. 1 is a view of the machine partly in front elevation and partly in vertical section.

The embodiment of the invention illustrated in the drawings comprises a container or bowl 1 to receive the meat or other material to be cut. The bowl 1 has a circular bottom 2 and a substantially cylindrical sidewall 3 which joins the bottom in a smoothly curved portion 4 which is of sufficiently large radius that there is no abrupt corner between the bottom and the sidewall. As will be seen in Fig. 1 the diameter of the bowl exceeds its depth. On the underside of the bottom 2 there is mounted an electric motor 5 which is located centrally of the bottom and has a vertical shaft 6 which extends axially of the bowl. A drive shaft 7 which may be either an extension of the motor shaft 6 or a separate shaft removably secured to the motor shaft so as to rotate therewith extends up into the bowl 1. A suitable fluid tight seal is provided to prevent leakage through the hole in the bottom wall through which the shaft extends. In the illustrated embodiment the motor runs in a counterclockwise direction as viewed from above. It is reversible so as to run at a lower speed in the reverse direction. For example, the motor may have a speed of 2800 to 3600 r.p.m. in a forward direction and 1400 to 1800 r.p.m. in a reverse direction.

Figure 3:
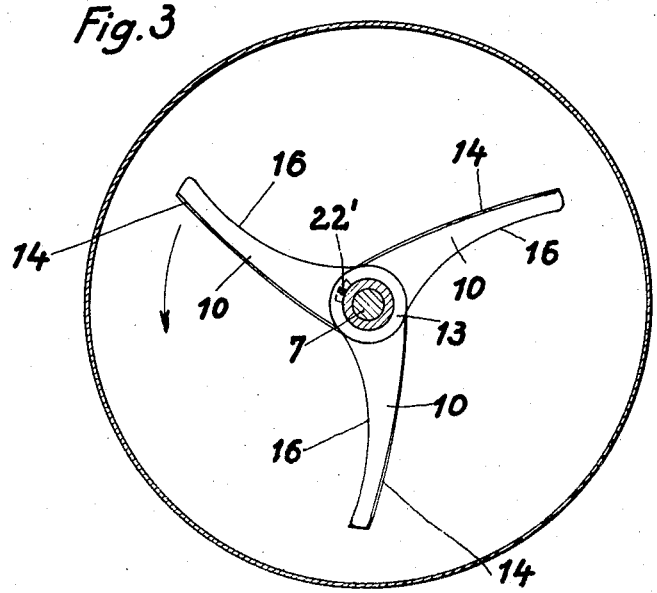
Fig. 3 is a horizontal section of the bowl and cutters taken approximately on the line 3—3 in Fig. 2.
Figure 6:
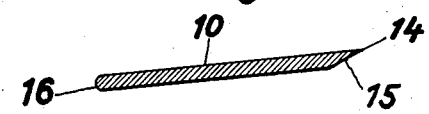
Fig. 6 is a cross section of one of the blades taken approximately on the line 6—6 in Fig. 4, but showing only the blade.

A plurality of cutting blades or knives 10 are mounted on the vertical shaft 7 near the bottom of the bowl 1. There are preferably a small number of knives, for example 2, 3 or 4, which are spaced from one another at equal angles. To facilitate cleaning and servicing as well as assembly of the apparatus, the blades 10 are mounted on a hollow mandrel 11 which is in turn secured on the shaft 7 so as to rotate therewith. Each of the knives 10 is shown as a single-ended blade having at one end a hole 12 of a diameter to fit snugly on the mandrel 11. The apertured end 13 of the blade is smoothly curved as shown. The leading edge of the blade—when rotating in a forward direction—is sharpened to provide a cutting edge 14. The sharpening is preferably by means of a single bevel surface 15 which slopes downwardly and rearwardly from the cutting edge. The rear edge 16 of the blade is blunt. Each knife 10 extends outwardly from the shaft 7 in a generally radial direction but curves rearwardly as seen in Fig. 3 like a sabre blade so that the cutting edge 14 has a somewhat spiral form. The knives are of such length that they extend most, but not all, of the way to the sidewall 3 of the bowl. They preferably extend approximately to the point where the curved wall portion 4 starts curving upwardly. For example, the length of the knives as measured from the center of the hole 12 to the tips of the blades is approximately three quarters to seven eighths the radius of the cylindrical wall portion of the bowl. The blade may be flat or the apertured end portion 13 of each blade may if desired be twisted relative to the rest of the blade so that even when the apertured end portion is horizontal in a transverse direction, the blade is inclined downwardly and rearwardly as illustrated in Fig. 6 so that it has a selected pitch.

Figure 2:
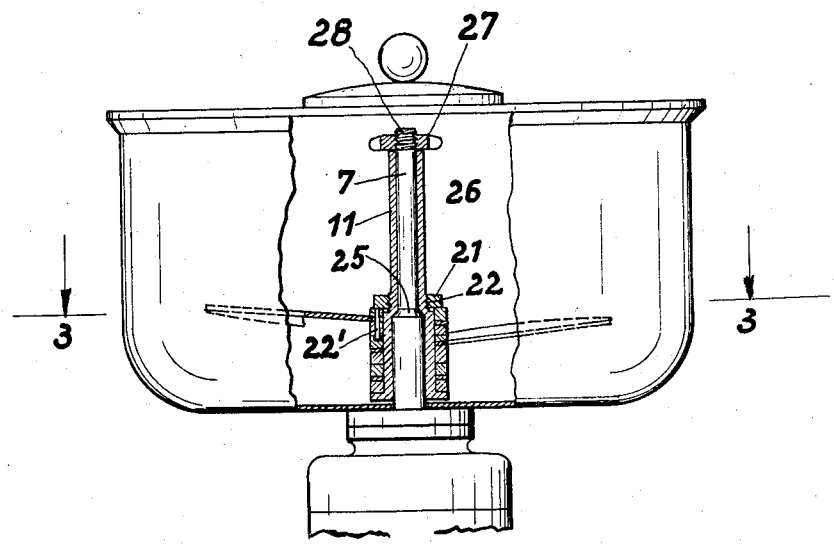
Fig. 2 is a partial side elevation with portions broken away and shown in vertical sections.
Figure 4:
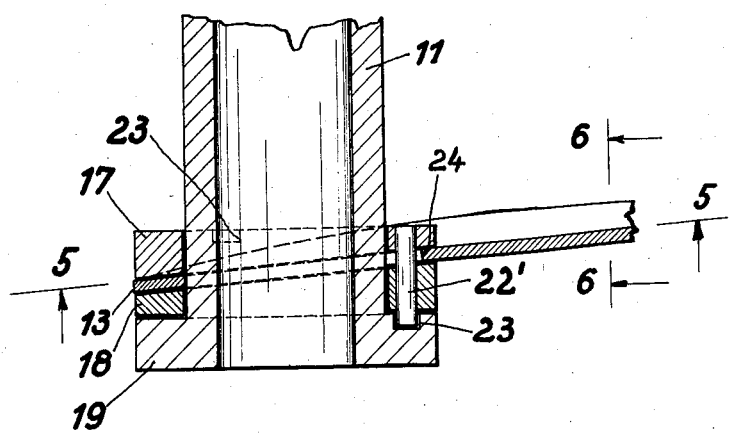
Fig. 4 is a fragmentary schematic vertical section taken approximately on the line 4—4 in Fig. 5 and showing one of the cutter blades mounted on the mandrel.

Means is provided for varying the pitch of the blades 10 and also for positioning them at a selected and variable angle with respect to the axis of the shaft 7. As illustrated in the drawing, the apertured end 13 of each of the blades is sandwiched between two collars 17 and 18 (Fig. 4). The collars are of a diameter to fit snugly over the mandrel 11. The upper collar 17 has an upper face which is perpendicular to the axis of the mandrel and a lower face which is inclined to the axis of the mandrel at a selected angle of for example about 5 to 10 degrees. The lower collar 18 has an inclined upper face parallel to the lower face of the upper collar 17 and a square lower face. In the case of the lowermost blade as illustrated in Fig. 4, the lower collar 18 rests on a radially projecting flange 19 provided at the lower end of the mandrel 11. Each of the other blades is sandwiched between similar pairs of collars which are stacked one above another on the mandrel as illustrated in Figs. 1 and 2 where three blades are shown. The whole assembly is then clamped tightly in place by means of a nut 21 screwed onto a threaded portion 22 of the mandrel.

Figure 5:
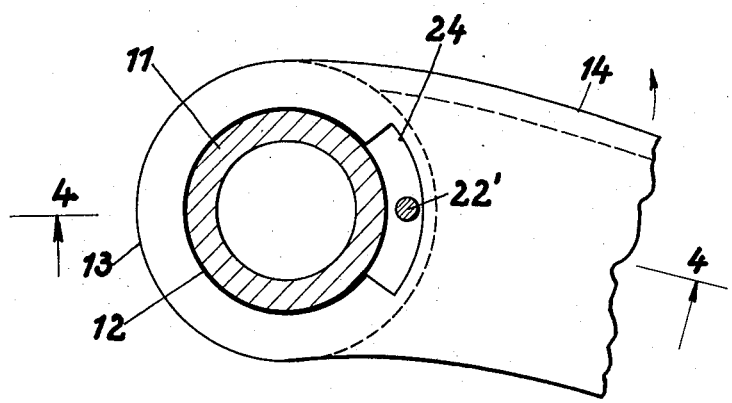
Fig. 5 is a cross section taken approximately on the line 5—5 in Fig. 4.

The two collars 17 and 18 of each pair are held against rotation relative to one another by means of a pin 22' that extends through aligned holes in the two collars. The pin 22' of the lowermost unit extends down into a recess 23 in the flange 19 of the mandrel so as to lock the collars rotationally with respect to the mandrel. The pin of each upper unit extends down into a similar recess in the upper face of the upper collar of the next lower unit so that all of the units are thus held against rotation relative to the mandrel. The upper face of each upper collar may if desired be provided with a plurality of angularly spaced recesses 23 to permit assembling the pairs of collars in selected angular relation with respect to one another. While a preferred arrangement is shown in the drawings, the pins 22 may be located differently with respect to the collars, for example at the diametrically opposite sides. Each of the blades has a cut-out portion 24 (Fig. 5) to accomodate the pin 22' while permitting angular adjustment of the blade relative to the collars 17 and 18 between which it is held. By turning the blade relative to the collars 17 and 18, inclination of the blade both longitudinally and transversely can be varied. Rotation of the blade in a clockwise direction from the central position shown in Fig. 5 increases the pitch of the blade while relative rotation in a counterclockwise direction decreases the pitch. The longitudinal inclination of the blade relatively to the horizontal is at a maximum in the central position shown and is decreased by relative movement of the blade in either direction.

The mandrel 11 rests on a tapered shoulder 25 of the shaft 7 and has an upwardly extending portion 26 of reduced diameter which extends to the top of the shaft 7. A nut 27 screwed onto a reduced threaded portion 28 at the upper end of the shaft 7 engages the top of the mandrel 11 to clamp the mandrel tightly on the shaft. Key means may be provided between the shaft and mandrel but this is ordinarily not necessary. The entire mandrel and blade assembly is readily removable merely by unscrewing the nut 27 which is located above the level of material in the bowl 1 and hence kept clear.

The bowl is provided with a cover 30 which is mounted on the bowl by a hinge 31 and is releasably held in closed position by a catch 31'. A window is preferably provided in the cover so that the interior of the bowl can be seen while the cover is closed.

At diametrically opposite sides, the bowl 1 is provided with radially projecting trunnions 32 rotatably supported in bearing portions 33 of a frame 34 so that the entire unit comprising the bowl 1 and motor 5 can be tipped through an angle of at least 90° about the axis of the trunnion. The bowl can thus be emptied merely by tipping it to permit the contents to fall out by gravity.

On one of the trunnions 32 there is provided a radially projecting lever 35 by means of which the bowl is readily tipped. On a projecting portion of the opposite trunnion there is mounted a control unit 36 comprising a motor control switch 37 having an operating handle 38 which is movable between an off position O, a low speed position L and a high position H. The control switch 37 is connected by a suitable control cable 39 to the motor 5 which is further provided with a reversing switch 40 having a handle movable between a forward position F and a reverse position R. An eccentric 41 rotatable with the control switch handle 38 is connected by a link 42 to a bolt 43 which is slidably supported by a bracket 44 and is adapted to engage in a notch 45 in a locking disc 46 which is rigid with the cover 30 and coaxial with the hinge 31. The lid 30 is thereby locked in closed position and can be opened only when the bolt 43 is withdrawn by moving the control lever 38 to "off" position. Conversely when the cover is open, engagement of the end of bolt 43 with the periphery of the disc 46 prevents moving the control lever 38 to turn the motor on.

The operation of the machine will be readily understood from the foregoing descriptions. With the control lever 38 in "off" position the cover 30 is opened and the meat or other material to be cut is charged into the bowl. The machine will handle meat in fist-size chunks. After the material has been put in, the cover is closed and latched. The motor is then started by means of the control lever 38 and brought up to full speed in a forward direction. The rapidly revolving knives 10 slice through the meat making the multiplicity of clean cuts as distinguished from the shearing or crushing action of an ordinary meat grinder. The cellular structure of the meat is thereby retained so that the natural juices are not lost. The cutting action of the blades is improved by the spiral shape of the leading edges so that a slicing cut is obtained. As the blades rotate, the material being cut is forced downwardly toward the bottom of the bowl by the pitch or inclination of the blades. The resulting downward pressure in cooperation with centrifugal force causes the material to move downwardly and then outwardly toward the sidewalls. The curved wall portions 4 direct it upwardly along the sidewalls. On reaching the upper portion of the bowl, the material flows radially inwardly and then downwardly into the zone of action of the blades. There is thus obtained a continual automatic recirculation of the material in the bowl so that it is subjected repeatedly to the cutting action of the rapidly revolving blades. The operation is continued until the material has been cut to the desired fineness. The motor is then stopped.

If it is desired to add any seasoning or other materials, the cover 30 is opened—with the control lever 38—in "off" position and the materials are then added. After the lid has been closed and latched, the motor is again started. If merely a mixing action is desired without further cutting, the motor is run in reverse direction at lower speed. The knives thereupon act merely as stirring paddles to mix the material.

When a batch has been completed, the motor is stopped by control lever 38, the cover 30 is opened and the material is emptied out by tipping the bowl 1 by means of the lever 35.

When it is desired to clean the machine, the nut 27 is unscrewed and the mandrel 11 carrying the entire blade assembly is removed from the shaft 7. The bowl 1 is then easily washed. The wash water is emptied merely by tipping the bowl. The mandrel and plate assembly is readily cleaned without removing the individual blades from the mandrel. Hence, the selected inclination and spacing of the blades is retained. If it is desired to change the spacing and inclination of the blades the nut 21 is unscrewed and the individual blades are turned relative to their respective collars 17 and 18 to obtain the desired adjustment. The nut 21 is then again tightened to lock the blades in position.

From the foregoing description, it will be seen that the machine in accordance with the invention is highly effective yet relatively simple and hence inexpensive. Moreover, it is safe to use and easy to clean and service. While a preferred embodiment of the invention has been shown in the drawings and particularly described, the invention is not limited to the example given.

What I claim and desire to secure by Letters Patent is:

1. Cutter for cutting meat to small size for use in sausage and the like, comprising a bowl having a bottom, a side wall of circular cross section and a curved portion uniting said side wall and bottom in a smooth curve, a shaft extending up through a central hole in said bottom and projecting upwardly in said bowl, a plurality of elongated cutter blades fixedly mounted on said shaft and radiating from said shaft, said blades being near the bottom of said bowl and extending almost to the circular side wall thereof, each of said blades having a sharp leading edge and being inclined downwardly and rearwardly from said leading edge, means for varying said inclination of the cutter blades and driving means comprising a motor mounted on the under side of the bottom of said bowl and driving connections between said motor and shaft to rotate said shaft at high speed and force said cutter blades through meat in said bowl to sever said meat into smaller pieces, the inclination of said blades and their position near the bottom of said bowl cooperating to force said meat downwardly toward said bottom and then radially outwardly above the bottom by centrifugal force, said meat being thereupon guided by said curved portion to flow upwardly along said side wall and then radially inwardly and downwardly into the zone of rotation of said blades to resubject said meat to the cutting action of said blades and thereby further reduce the size of the pieces, the entire mass of meat being thus recirculated and subjected uniformly to repeated cutting action of said blades to cut said meat rapidly to small size suitable for sausage.

2. A meat cutter according to claim 1, in which said blades are sharpened only on the forward edge and in which means is provided for driving said shaft and blades in a reverse direction at a materially lower speed than in forward direction.

3. In a meat cutter according to claim 1, a supporting frame, means tiltably mounting said bowl in said frame for said bowl and attached to tilt as a unit, and means for locking said bowl in selected position.

4. In a meat cutter according to claim 3, a cover hingedly connected to said bowl and swingable from a bowl-closing position to an open position, means for locking said cover in closed position, switch means controlling said motor and operable between off and on positions and means interconnecting said cover locking means and switch means to prevent starting said motor unless said cover is locked in closed position.

5. Apparatus for cutting meat and other materials to small size, comprising a bowl having a bottom, a side wall of circular cross section and a curved portion uniting said side wall and bottom in a smooth curve, means mounting said bowl for tipping about a horizontal axis through at least 90°, an electric motor mounted centrally on the underside of said bottom with its axis vertical, a drive shaft driven by said motor and projecting axially upwardly in said bowl, a tubular mandrel removably mounted on said shaft to rotate therewith, said mandrel having an annular projecting shoulder at its lower end, a plurality of pairs of collars assembled on end-to-end on said mandrel, each pair having facing end surfaces which are parallel to one another and inclined to the axis of the mandrel and opposite end surfaces perpendicular to said axis, a corresponding number of single-ended cutting knives each having a sharp leading edge and an apertured inner end portion fitting over said mandrel and sandwiched between said inclined end surfaces of the respective pair of collars, each of said knives being thus held at an angle to said axis and the lengthwise and transverse inclination of each knife being variable by rotation of said knife relative to the collars between which said knife is held and means cooperating with said flange releasably to clamp said assembled collars and knives fixedly on said mandrel, said knives radiating from said mandrel in the lower portion of said bowl and extending most of the way to, but terminating short of, the side wall of said bowl.

6. Apparatus according to claim 5, further comprising means interconnecting said collars with one another and with said mandrel to rotate with said mandrel.

7. Apparatus according to claim 5, further comprising a hinged cover, a control switch connected to and controlling said motor and means interconnecting said control switch and cover to lock said cover in closed position when said motor is turned on and to lock said control switch in off position when said cover is open.

8. Cutter for cutting meat to small size for use in sausage and the like, comprising a bowl having a bottom, a side wall of circular cross section and a curved portion uniting said side wall and bottom in a smooth curve, a shaft extending up through a central hole in said bottom and projecting upwardly in said bowl, a plurality of annular collars axially slidable on said shaft and having end faces defined by planes inclined at an angle to said shaft, a plurality of elongated cutter blades radiating from said shaft, each of said blades having at one end thereof an aperture fitting over said shaft, the apertured end portions of said blades being received between said inclined end faces of said collars, means for clamping said collars and interposed blades in selected fixed position on said shaft, said blades being near the bottom of said bowl and each of said blades having a sharp leading edge and being inclined downwardly and rearwardly from said leading edge and driving means comprising a motor mounted on the under side of the bottom of said bowl and driving connections between said motor and shaft to rotate said shaft at high speed and force said cutter blades through meat in said bowl to sever said meat into smaller pieces, the inclination of said blades and their position near the bottom of said bowl cooperating to force said meat downwardly toward said bottom and then radially outwardly above the bottom by centrifugal force, said meat being thereupon guided by said curved portion to flow upwardly along said side wall and then radially inwardly and downwardly into the zone of rotation of said blades to resubject said meat to the cutting action of said blades and thereby further reduce the size of the pieces, the entire mass of meat being thus recirculated and subjected uniformly to repeated cutting action of said blades to cut said meat rapidly to small size suitable for sausage.

9. A meat cutter according to claim 8, in which a pin connects said spacer discs on opposite sides of a blade and in which said blade has an arcuate slot receiving said pin and permitting limited relative rotary adjustment between said blade and discs.

10. A meat cutter according to claim 8, in which said blades and discs are fixed on a tubular mandrel and in which said mandrel is in turn removably fixed on said shaft.

References Cited in the file of this patent

UNITED STATES PATENTS

| | | |
|---|---|---|
| 165,442 | Goddard | July 13, 1875 |
| 1,623,795 | Knowlton | Apr. 5, 1927 |
| 1,788,214 | Van Hooydonk | Jan. 6, 1931 |
| 2,352,232 | Strauss | June 27, 1944 |
| 2,627,075 | Benson | Feb. 3, 1953 |